(12) United States Patent
Brunswick

(10) Patent No.: US 9,475,260 B2
(45) Date of Patent: Oct. 25, 2016

(54) SOUND INSULATION

(71) Applicant: Brunswick et Fils, Paris (FR)

(72) Inventor: Jean-Claude Brunswick, Bordeaux (FR)

(73) Assignee: BRUNSWICK ET FILS (FR)

( * ) Notice: Subject to any disclaimer, the term of this patent is extended or adjusted under 35 U.S.C. 154(b) by 0 days.

(21) Appl. No.: 13/755,572

(22) Filed: Jan. 31, 2013

(65) Prior Publication Data

US 2014/0034415 A1 Feb. 6, 2014

(30) Foreign Application Priority Data

Feb. 2, 2012 (FR) ...................... 12 50968

(51) Int. Cl.
*B32B 7/02* (2006.01)
*G10K 11/168* (2006.01)
*B32B 5/26* (2006.01)
*B32B 5/02* (2006.01)
*D06M 11/83* (2006.01)
*D06M 17/00* (2006.01)
(Continued)

(52) U.S. Cl.
CPC .................. *B32B 7/02* (2013.01); *B32B 5/024* (2013.01); *B32B 5/26* (2013.01); *D06M 11/83* (2013.01); *D06M 17/00* (2013.01); *G10K 11/168* (2013.01); *B32B 2262/062* (2013.01); *B32B 2307/102* (2013.01); *E04B 1/8409* (2013.01); *E04B 2001/7691* (2013.01)

(58) Field of Classification Search
CPC ............. B32B 5/24; B32B 5/26; B32B 7/02; D06M 11/83; G10K 11/168
USPC .................................................. 181/287, 290
See application file for complete search history.

(56) References Cited

U.S. PATENT DOCUMENTS 3,231,042 A 1/1966 Chapman
5,360,668 A * 11/1994 Sternlieb ........................ 428/372
(Continued)

FOREIGN PATENT DOCUMENTS

DE 102006019669 A1 11/2007
FR 2572272 A1 5/1986
(Continued)

OTHER PUBLICATIONS

Nazire Deniz Yilmaz et al., "Effects of Porosity, Fiber Size, and Layering Sequence on Sound Absorption Performance of Needle-Punched Nonwovens," Journal of Applied Polymer Science, vol. 121, No. 5, Mar. 31, 2011, pp. 3056-3069.
(Continued)

*Primary Examiner* — Jeremy Luks
(74) *Attorney, Agent, or Firm* — The Belles Group, P.C.

(57) ABSTRACT

A sound insulation device (D) includes at least three layers:
a first layer (1), facing a sound source to be blocked, comprising a blackout cloth with a weight greater than 250 g/m$^2$,
a second layer (2) including a metalized cloth, a metalized face (2a) of the cloth being disposed in contact with the first layer,
a third layer (3) including a brushed cotton cloth having a weight greater than 250 g/m$^2$, disposed in contact with the second layer (2) on the side opposite the first layer (1), the metalized cloth being produced by in vacuo metallization of a woven substrate previously calendered by the application of a compression force.

10 Claims, 1 Drawing Sheet

(51) Int. Cl.
  *E04B 1/84* (2006.01)
  *E04B 1/76* (2006.01)

(56) References Cited

U.S. PATENT DOCUMENTS

| | | | |
|---|---|---|---|
| 5,741,582 A * | 4/1998 | Leaderman et al. | 428/317.5 |
| 2002/0122949 A1 * | 9/2002 | Richards | 428/462 |
| 2004/0170800 A1 * | 9/2004 | Richards | 428/90 |
| 2004/0231915 A1 | 11/2004 | Thompson et al. | |
| 2007/0163725 A1 * | 7/2007 | Macha | 160/124 |
| 2010/0122783 A1 * | 5/2010 | Harris et al. | 160/405 |
| 2010/0282419 A1 * | 11/2010 | Ligas, Sr. | 160/84.01 |
| 2012/0178321 A1 | 7/2012 | Brunswick | |

FOREIGN PATENT DOCUMENTS

| | | |
|---|---|---|
| FR | 2726886 A1 | 5/1996 |
| WO | WO-2006029294 A1 | 3/2006 |
| WO | WO-2011016015 A2 | 2/2011 |

OTHER PUBLICATIONS

Meier A., Muller K., "Schallreflektierende und schallabsorbierende Stoffee fur raumakustische Anwendungen," In: DAGA 2010, 2010, Berlin, pp. 931-932.

* cited by examiner

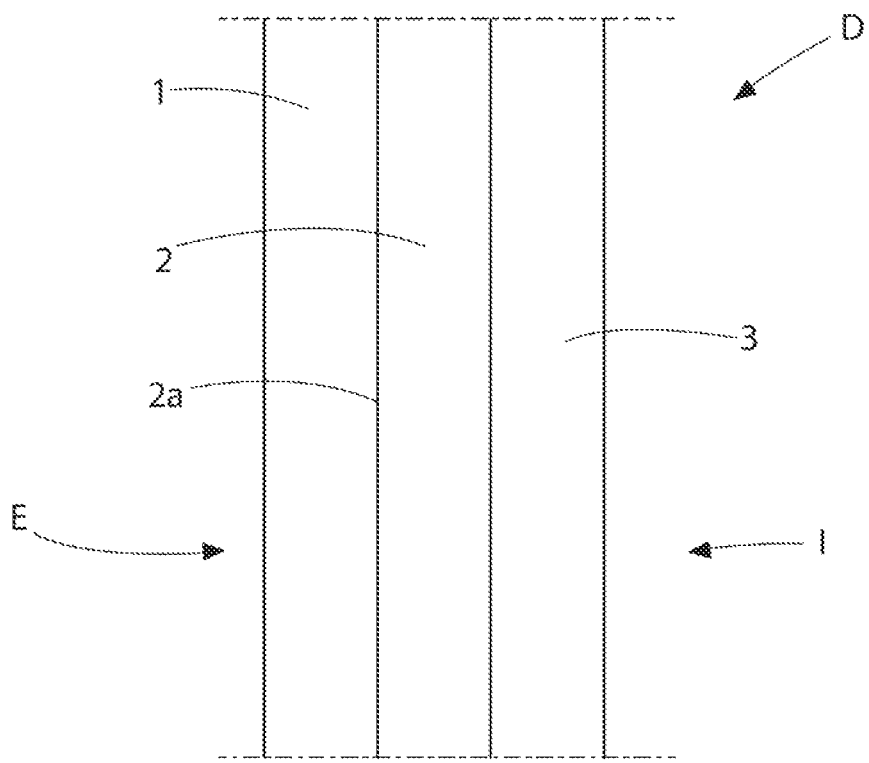

SOUND INSULATION

PRIORITY

Priority is claimed to French Application No. 12 50968, filed Feb. 2, 2012, the disclosure of which is incorporated herein by reference in its entirety.

FIELD OF THE INVENTION

The field of the present invention relates to a sound insulation device.

BACKGROUND

In a context of improving the quality of life, the preservation of the habitat from sound nuisances is important.

The openings from a building to the outside very often have poor sound insulation and the glazed area is tending to increase with the aim of improving the entry of natural light. Existing solutions use fabrics that enable only a limited performance in terms of sound insulation or use metal films that generate highly unpleasant crumpling noises.

The object of the invention is thus to provide a sound insulation device that offers sound insulation performance but does not generate unwanted noises degrading the level of comfort of the building and has an agreeable aesthetic appearance enabling harmonious integration into the building.

SUMMARY OF THE INVENTION

A sound insulation device of the invention is characterized in that it includes at least three layers:
- a first layer, facing a sound source to be blocked, comprising a blackout cloth with a weight greater than 250 g/m$^2$,
- a second layer including a metalized cloth, a metalized face of the cloth being disposed in contact with the first layer,
- a third layer including a brushed cotton cloth having a weight greater than 250 g/m$^2$, disposed in contact with the second layer on the side opposite the first layer,
- the metalized cloth being produced by in vacuo metallization of a woven substrate previously calendered by the application of a compression force.

The woven substrate advantageously includes threads with a maximum weight of 70 deniers with a minimum of 30 filaments per thread.

The use of fine strands enables the brilliance of the substrate and therefore the brilliance of the metalized fabric to be increased. A thread including 36 filaments is preferably used having a weight of 50 deniers.

Tests carried out by the inventor have shown that the use of a woven substrate, commonly referred to as cloth, was essential to achieve the flexibility objectives.

In the case of use of the sound insulation of the invention as a curtain, the flexibility of the cloth has a high impact on the fall and aesthetic appearance of a curtain made from it.

The cloth used for the third layer may include brushed cotton.

It is desirable to use materials of high weight in order to maximize the sound insulation properties. The first layer preferably comprises a blackout cloth having a weight greater than 260 g/m$^2$.

The third layer may also comprise a blackout cloth having a weight greater than 260 g/m$^2$.

The woven substrate used, also referred to as cloth, is preferably based on synthetic fibers.

The woven substrate may be based on microfibers, i.e. fibers having more than 100 filaments per decitex, or fine strands, i.e. fibers having close to 100 filaments per decitex.

Using synthetic fibers makes it possible to provide a material that can at least partially melt without burning. The use of microfibers or fine strands enables the flexibility of the cloth to be preserved.

The weaving of the threads is dense and very tight. The woven substrate preferably comprises at least 42 warp threads and 40 weft threads per inch. The woven substrate more preferably comprises 44 warp threads and 41 weft threads per inch.

The cloth used for the second layer is preferably washed before calendering, prior to the deposition of a metallic layer. This operation is also known as desizing. Indeed, in the usual cloth fabrication techniques a deposit of size is applied to the threads before they are woven. This size must be eliminated, notably to preserve the flexibility of the product.

To obtain optimum desizing, it is possible to perform two desizing passes, for example using soda for one of the two passes.

Calendering is effected in one pass or a plurality of successive passes on one or both faces of the substrate and during calendering a compression force is applied to the cloth at a high temperature.

One pass at 15 m/minute on each face at a temperature of 195° C. and a force of 80 tonnes enables the required effect to be obtained.

The objective is to evacuate some of the air present in the cloth. It is found that a vacuum pressure of $2.3 \times 10^{-3}$ atm (higher value $24 \times 10^{-2}$ atm) is necessary to enable the metallization phase to be carried out. The thread count, i.e. all of the properties of the cloth, and the treatments carried out on the cloth make it possible to remain below this value.

The metallization phase is effected in vacuo at 400 m/minute, notably, by vapor phase deposition of metal. The metal deposited may be aluminum or silver, for example.

Other features and advantages of the invention will become apparent in the course of the following description of a preferred embodiment given with reference to the appended drawing but in no way limiting on the invention.

BRIEF DESCRIPTION OF THE DRAWING

FIG. 1 is a diagrammatic view partly in section of a device of the invention.

DETAILED DESCRIPTION OF THE PREFERRED EMBODIMENT

There can be seen in FIG. 1 a device D of the invention including a first layer 1 facing an outdoor area E from which come sounds to be blocked.

The first layer 1 is contiguous with a second layer 2 or internal layer composed of a cloth including a metallic layer 2a on the face in contact with the first layer 1.

Finally, a third layer 3 is disposed in contact with the second face of the second layer 2, on the side opposite the first layer 1.

Tests have been carried out demonstrating that the insulation in accordance with the invention can enable attenuation of external noise by up to 7 dB, i.e. a reduction of three quarters.

The insulation of the invention is therefore particularly suited to the production of curtains placed in front of windows or french windows inside dwellings.

The invention claimed is:

1. A sound insulation device (D), which includes at least three layers:
- a first layer, facing a sound source to be blocked, comprising a first blackout cloth with a weight greater than 250 g/m², wherein the first blackout cloth consists of a first woven material,
- a second layer including a metalized cloth, a metalized face of the cloth being disposed in contact with the first layer,
- a third layer comprising a second blackout cloth having a weight greater than 250 g/m², disposed in contact with the second layer on the side opposite the first layer,
- the metalized cloth being produced by in vacuo metallization of a woven substrate previously calendered by the application of a compression force.

2. The sound insulation device as claimed in claim 1, wherein the metalized cloth includes threads with a maximum weight of 70 deniers with a minimum of 30 filaments per thread.

3. The sound insulation device as claimed in claim 1, wherein the second blackout cloth used for the third layer consists of a second woven material formed of brushed cotton.

4. The sound insulation device as claimed in claim 1, wherein the first blackout cloth of the first layer has a weight greater than 260 g/m².

5. The sound insulation device as claimed in claim 1, wherein the second blackout cloth of the third layer has a weight greater than 260 g/m².

6. A sound insulation device (D), which includes at least three layers:
- a first layer comprising a first blackout cloth with a weight greater than 250 g/m², wherein the first blackout cloth consists of a first woven material,
- a second layer including a metalized cloth having a vacuo-metalization layer deposited on a woven and calendered substrate, the vacuo-metalization layer being disposed in contact with the first layer; and
- a third layer comprising a brushed cotton cloth disposed in contact with the second layer on the side opposite the first layer,
- wherein the first, second, and third layers attenuate noise from a sound source passing through the first layer to the third layer by about 7 dB.

7. The sound insulation device as claimed in claim 6, wherein the metalized cloth includes threads with a maximum weight of 70 deniers with a minimum of 30 filaments per thread.

8. The sound insulation device as claimed in claim 6, wherein the brushed cotton cloth used for the third layer consists of a second woven material.

9. The sound insulation device as claimed in claim 6, wherein the first blackout cloth of the first layer has a weight greater than 250 g/m².

10. The sound insulation device as claimed in claim 6, wherein the brushed cotton cloth of the third layer has a weight greater than 260 g/m².

* * * * *